United States Patent
Kim et al.

(10) Patent No.: US 10,545,365 B2
(45) Date of Patent: Jan. 28, 2020

(54) DISPLAY DEVICE HAVING POLYMER DISPERSED LIQUID CRYSTALS

(71) Applicant: LG DISPLAY CO., LTD., Seoul (KR)

(72) Inventors: JinYeong Kim, Goyang-si (KR); DongHoon Lee, Goyang-si (KR); JinWoo Park, Goyang-si (KR); Bogyun Chung, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 158 days.

(21) Appl. No.: 15/092,311

(22) Filed: Apr. 6, 2016

(65) Prior Publication Data

US 2016/0320644 A1 Nov. 3, 2016

(30) Foreign Application Priority Data

Apr. 30, 2015 (KR) .................. 10-2015-0061061

(51) Int. Cl.
*G02F 1/1334* (2006.01)
*G02F 1/1335* (2006.01)
*G02F 1/1347* (2006.01)

(52) U.S. Cl.
CPC ........ *G02F 1/1334* (2013.01); *G02F 1/13476* (2013.01); *G02F 1/133555* (2013.01); *G02F 2001/13347* (2013.01); *G02F 2001/133557* (2013.01)

(58) Field of Classification Search
CPC ... G02F 1/133555; G02F 2001/133557; G02F 1/1334; G02F 2001/13347; G02F 1/13476
See application file for complete search history.

(56) References Cited

U.S. PATENT DOCUMENTS

| | | | |
|---|---|---|---|
| 2001/0055082 A1* | 12/2001 | Kubo | G02F 1/133371 349/114 |
| 2004/0223099 A1 | 11/2004 | Kotchick et al. | |
| 2009/0128737 A1 | 5/2009 | Ouderkirk et al. | |
| 2010/0060825 A1* | 3/2010 | Jang | B82Y 20/00 349/86 |
| 2010/0208333 A1* | 8/2010 | Omote | G02F 1/133308 359/320 |
| 2012/0113363 A1* | 5/2012 | Lim | G02F 1/1334 349/96 |

FOREIGN PATENT DOCUMENTS

| | | |
|---|---|---|
| CN | 1142869 A | 2/1997 |
| CN | 1784630 A | 6/2006 |
| CN | 101180566 A | 5/2008 |
| KR | 20120044811 A | 5/2012 |
| WO | 2008076253 A2 | 6/2008 |

\* cited by examiner

*Primary Examiner* — Jessica M Merlin
(74) *Attorney, Agent, or Firm* — Dentons US LLP (57) ABSTRACT

Disclosed is a display device that includes a display area having an appearance of a specific color in a non-driving state or displaying a specific screen by using PDLC to improve esthetic appearance as in a home appliance. The display device comprises a reflective dispersed layer arranged on a display panel, wherein the reflective dispersed layer includes a PDLC layer between a first substrate and a second substrate, and a transflective layer arranged between the PDLC layer and the second substrate to transmit light externally emitted from the display panel and reflect externally incident light.

11 Claims, 11 Drawing Sheets

DISPLAY DEVICE HAVING POLYMER DISPERSED LIQUID CRYSTALS

CROSS REFERENCE TO RELATED APPLICATIONS

This application claims the benefit of the Korean Patent Application No. 10-2015-0061061 filed on Apr. 30, 2015, which is hereby incorporated by reference for all purposes as if fully set forth herein.

BACKGROUND OF THE INVENTION

Field of the Invention

The present invention relates to a display device. More particularly, the present invention relates to a display device having polymer dispersed liquid crystals (PDLC).

Discussion of the Related Art

With the advancement of the information age, display fields for visually displaying an electrical signal have been rapidly developed. In response to this trend, various flat display devices having excellent performance such as thin profile, lightweight, and low power consumption have been developed to replace the existing cathode ray tube (CRT).

The flat display devices may include liquid crystal display (LCD) devices, organic light emitting display (OLED) devices, electrophoretic display (EPD, electric paper display) devices, plasma display panel (PDP) devices, field emission display (FED) devices, electroluminescence display (ELD) devices, and electro-wetting display (EWD) devices.

The flat display devices of the related art display images in a display area while emitting light of specific luminance and specific color for each pixel during driving. However, during non-driving, the flat display devices of the related art display a black color through the display area. In this way, in the flat display devices of the related art, since the display area maintains a black color in a non-driving state in which a power is not supplied, a problem occurs in that esthetic appearance, such as if a home appliance, is not good.

SUMMARY OF THE INVENTION

Accordingly, the present invention is directed to a display device that substantially obviates one or more problems due to limitations and disadvantages of the related art.

An advantage of the present invention is to provide a display device that includes a display area having the appearance of a specific color or displaying a specific screen even during a non-driving state by using polymer dispersed liquid crystals (PDLC) to improve an esthetic appearance, for example, in a home appliance.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, a display device having polymer dispersed liquid crystals (PDLC) according to the present invention comprises a reflective dispersed layer arranged on a display panel, wherein the reflective dispersed layer includes a PDLC layer between a first substrate and a second substrate, and a transflective layer arranged between the PDLC layer and the second substrate to transmit light externally emitted from the display panel and reflect externally incident light.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE ILLUSTRATED EMBODIMENTS

Terms disclosed in this specification should be understood as follows.

The term of a singular expression should be understood to include a multiple expression as well as the singular expression if there is no specific definition in the context. The terms such as "the first" and "the second" are used only to differentiate one element from other elements. Thus, a scope of claims is not limited by these terms. Also, it should be understood that the term such as "include" or "have" does not preclude existence or possibility of one or more features, numbers, steps, operations, elements, parts or their combinations. It should be understood that the term "at least one" includes all combinations related with any one item. For example, "at least one among a first element, a second element and a third element" may include all combinations of two or more elements selected from the first, second and third elements as well as each element of the first, second and third elements. Also, if it is mentioned that a first element is positioned "on or above" a second element, it should be understood that the first and second elements may be brought into contact with each other, or a third element may be interposed between the first and second elements.

Hereinafter, embodiments of a display device having polymer dispersed liquid crystals (PDLC) according to the present invention will be described in detail with reference to the accompanying drawings.

For reference, the display device of the present invention may be realized based on flat display devices such as liquid crystal display (LCD) devices, field emission display (FED) devices, plasma display panel (PDP) devices, organic light emitting display (OLED) devices, and electrophoretic display (EPD). In the following embodiments, although the liquid crystal display device will be described as an example of the flat display devices, it should be noted that the display device of the present invention is not limited to the liquid crystal display device.

Figure 1:
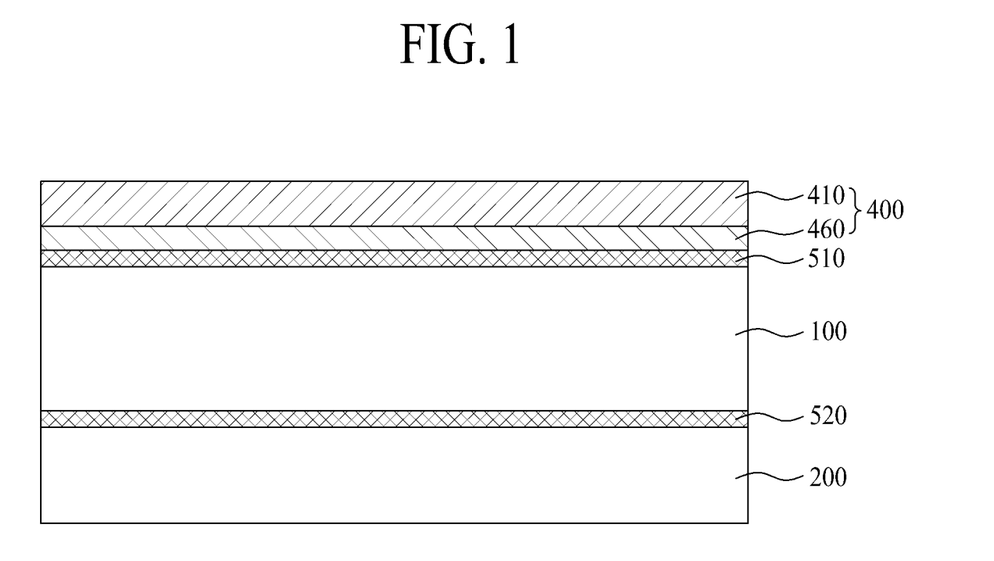
FIG. 1 is a cross-sectional view illustrating a liquid crystal display device according to the first embodiment of the present invention.
Figure 2:
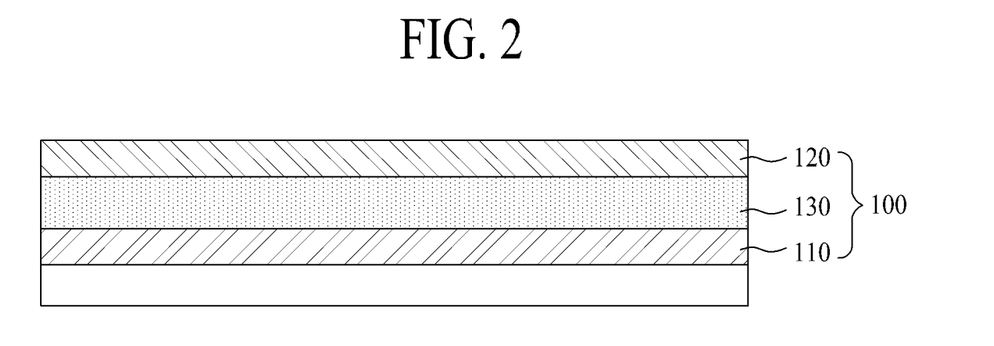
FIG. 2 is a cross-sectional view illustrating a liquid crystal panel shown in FIG. 1.
Figure 3:
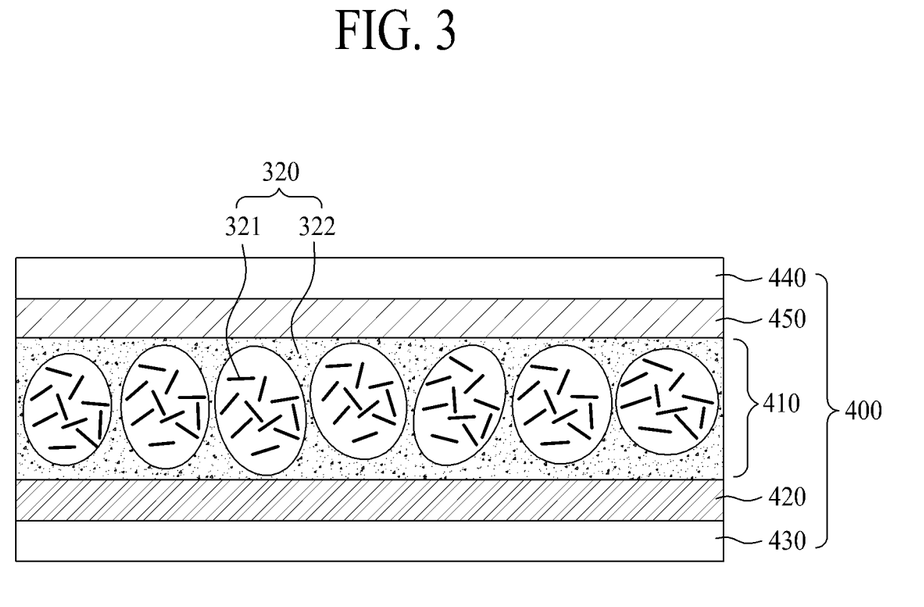
FIG. 3 is a cross-sectional view illustrating a PDLC layer shown in FIG. 1.

FIG. 1 is a cross-sectional view illustrating a liquid crystal display device according to the first embodiment of the present invention. FIG. 2 is a cross-sectional view illustrating a liquid crystal panel shown in FIG. 1. FIG. 3 is a cross-sectional view illustrating a PDLC layer shown in FIG. 1.

Referring to FIG. 1, the liquid crystal display device according to the first embodiment of the present invention includes a liquid crystal display panel 100 and a reflective dispersed layer 400. The reflective dispersed layer 400 is arranged on the liquid crystal display panel 100. The reflective dispersed layer 400 includes a PDLC layer 410 and a transflective layer 460. The transflective layer 460 is arranged below the PDLC layer 410 to transmit light externally emitted from the liquid crystal display panel 100 and reflect externally incident light.

In more detail, the liquid crystal display device according to the first embodiment of the present invention includes the liquid crystal display panel 100, the transflective layer 460, the PDLC layer 410, a backlight unit 200, a first polarizing layer 520, and a second polarizing layer 510.

The liquid crystal display panel 100 defines a plurality of pixel areas respectively corresponding to a plurality of pixels and display an image by controlling a light transmittance of each of the plurality of pixel areas. The transflective layer 460 is formed above the liquid crystal panel 100 to transmit light externally emitted from the liquid crystal display panel 100 and reflect light externally entering the liquid crystal panel 100. The PDLC layer 410 is formed on the transflective layer 460 to selectively disperse light which is externally emitted. The backlight unit 200 is arranged below the liquid crystal panel 100 to irradiate light towards the liquid crystal panel 100. The first polarizing layer 520 is arranged between the liquid crystal panel 100 and the backlight unit 200 to polarize the light irradiated from the backlight unit 200. The second polarizing layer 510 is arranged between the liquid crystal panel 100 and the transflective layer 460 to polarize the light emitted from the liquid crystal panel 100.

Referring to FIG. 2, the liquid crystal panel 100 includes lower substrate 110 and upper substrate 120 facing each other, and a first liquid crystal layer 130 formed between the lower substrate 110 and the upper substrate 120. In this case, the lower substrate 110 defines a plurality of pixel areas respectively corresponding to a plurality of pixels, and is provided with a plurality of thin film transistors arranged to correspond to the plurality of pixels. Therefore, the lower substrate 110 may be referred to as a thin film transistor (TFT) array substrate. Since the upper substrate 120 is provided with a color filter layer arranged to transmit light of a wavelength area corresponding to a color of each of the plurality of pixel areas, the upper substrate 120 may be referred to as a color filter (CF) array substrate. The liquid crystal panel 100 may be driven in a vertical electric field mode or a horizontal electric field mode.

The transflective layer 460 is formed in a structure that a thin prism film (not shown) and a reflective polarized film (not shown) are bonded to each other, and reflect light entering a surface where a prism mountain is formed, but transmits light entering a surface where a prism mountain is not formed. The transflective layer 460 transmits light emitted from the liquid crystal panel 100 and polarized by the second polarizing plate 510. That is, the light externally directed from the liquid crystal panel 100, and reflects light externally entering the liquid crystal panel 100.

The thin prism film of the transflective layer 460 has one surface on which triangular prisms (corresponding to the above "prism mountain") are arranged in parallel along one direction and another surface bonded to the reflective polarized film. The reflective polarized film may be comprised of multi-layered optical films of several hundreds of layers overlapped with one another with a thickness of several hundreds of um and their respective refractive indexes different from one another. The reflective polarized film has reflectivity with respect to light polarized in one direction and transmissivity with respect to light polarized in another direction. At this time, the light reflected by the reflective polarized film may again be reflected and transmitted by being modified to the light polarized in the another direction, whereby the amount of the light transmitted by the transflective layer 460 may be increased. The transflective layer 460 may be made of polyester material and serve as a mirror. The transflective layer 460 according to one example may be used as a dual brightness enhancement film (DBEF) manufactured and sold by 3M company. Also, the transflective layer 460 may be comprised of a metal layer such as Al, Ag and Cr. Moreover, the transflective layer 460 may be comprised of Ag-wire coating layer having polarizing property. The transflective layer 460 comprised as above may serve as a second electrode 420 which is a lower driving electrode of the PDLC layer 410.

Referring to FIG. 3, as described above, the reflective dispersed layer 400 includes a PDLC layer 410, and a transflective layer 460 arranged below the PDLC layer 410 to transmit light externally emitted from the liquid crystal panel 100 and reflect externally incident light. For reference, the transflective layer 460 is not shown in FIG. 3 since the transflective layer 460 is served as the second electrode 420.

The reflective dispersed layer 400 includes first substrate 440 and second substrate 430 facing each other, a first electrode 450 on the first substrate 440, and a second electrode 420 on the second substrate 430. In this case, the first electrode 450 and second electrode 420 are arranged to face each other. The PDLC layer 410 is provided between the first electrode 450 and the second electrode 420. The PDLC layer 410 includes a second liquid crystal layer 320 which is capsulated. The second liquid crystal layer 320 includes at least one capsulated liquid crystal 321 and a filling layer 322. The filling layer 322 is formed of polymer to surround and capsulate the liquid crystal layer 321. The second liquid crystal layer 320 may be formed by injecting a mixture of a polymer monomer capable of UV hardening and the capsulated liquid crystal 321 between the first electrode 450 and the second electrode 420, deriving phase separation of the liquid crystal and polymer through exposure, and capsulating the liquid crystal 321.

At least one capsulated liquid crystal 321 is randomly arranged in its initial state because a specific alignment direction is not formed inside the capsule. The light entering the second liquid crystal layer 320 of the initial state is dispersed by the capsulated liquid crystal 321 randomly arranged within the capsule and a difference in a refractive index between the capsulated liquid crystal 321 and the filling layer 322. Hereinafter, the PDLC layer 410 driven to allow the second liquid crystal layer 320 to disperse the light will be referred to as a "PDLC layer 410 of a dispersed mode".

However, if a voltage difference occurs between the first electrode 450 and the second electrode 420, a predetermined electric field is formed between the first electrode 450 and the second electrode 420, and the capsulated liquid crystals 321 randomly arranged in initial state are aligned in one direction by the electric field between the first electrode 450 and the second electrode 420, whereby the light entering the second liquid crystal layer 320 is transmitted as it is. Hereinafter, the PDLC layer 410 driven to allow the second liquid crystal layer 320 to transmit the light will be referred to as a "PDLC Layer 410 of a transmissive mode". Moreover, since the electric field is formed between the first electrode 450 and the second electrode 420, the PDLC layer 410 of the transmissive mode may indicate a turn-on state, and the PDLC layer 420 of the dispersed mode may indicate a turn-off state.

In FIG. 3, the transflective layer which serves as the second electrode 420 is preferably made of a metal layer, such as Al, Ag and Cr, which is a reflective material. In the present invention, a transflective layer cannot be provided separately from the first and second electrodes 450 and 420 provided to drive the PDLC layer 410, whereby it is advantageous in that the structure of the present invention is simplified.

Figure 4A:
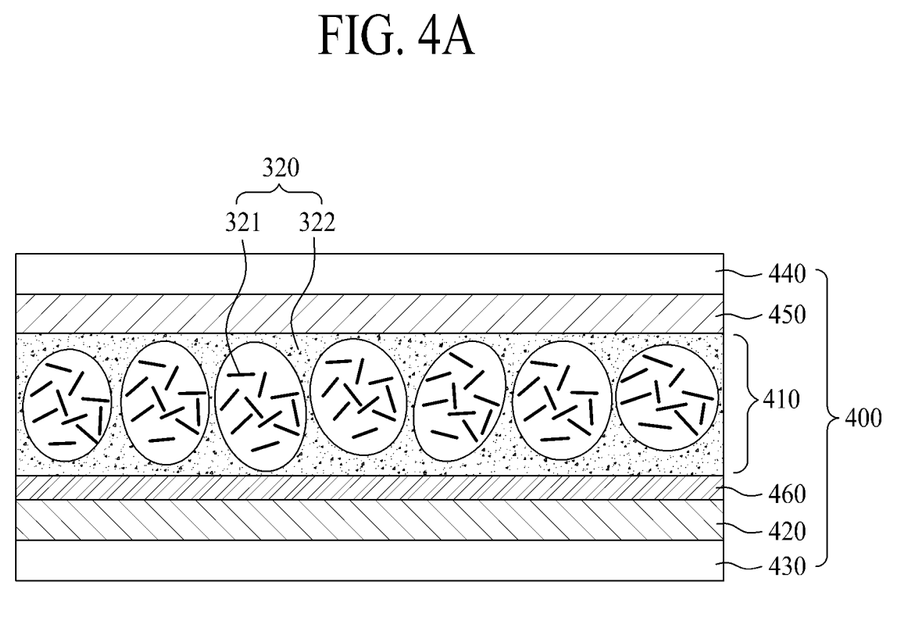
FIGS. 4A, 4B and 4C are cross-sectional views illustrating a PDLC layer according to a modified example of FIG. 3.
Figure 4B:
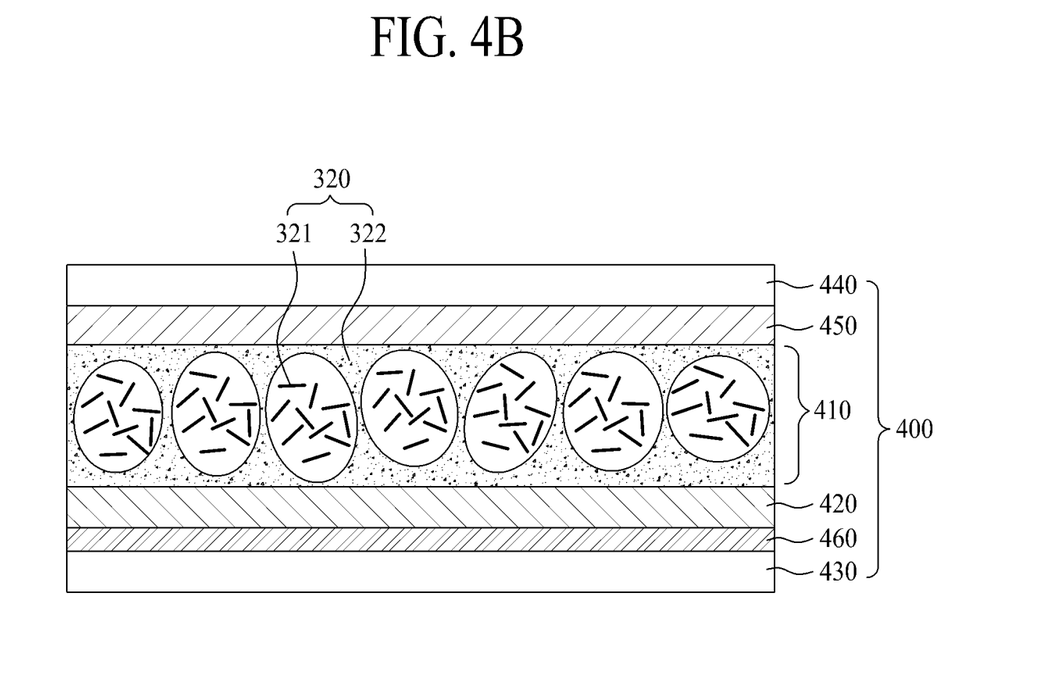
Figure 4C:
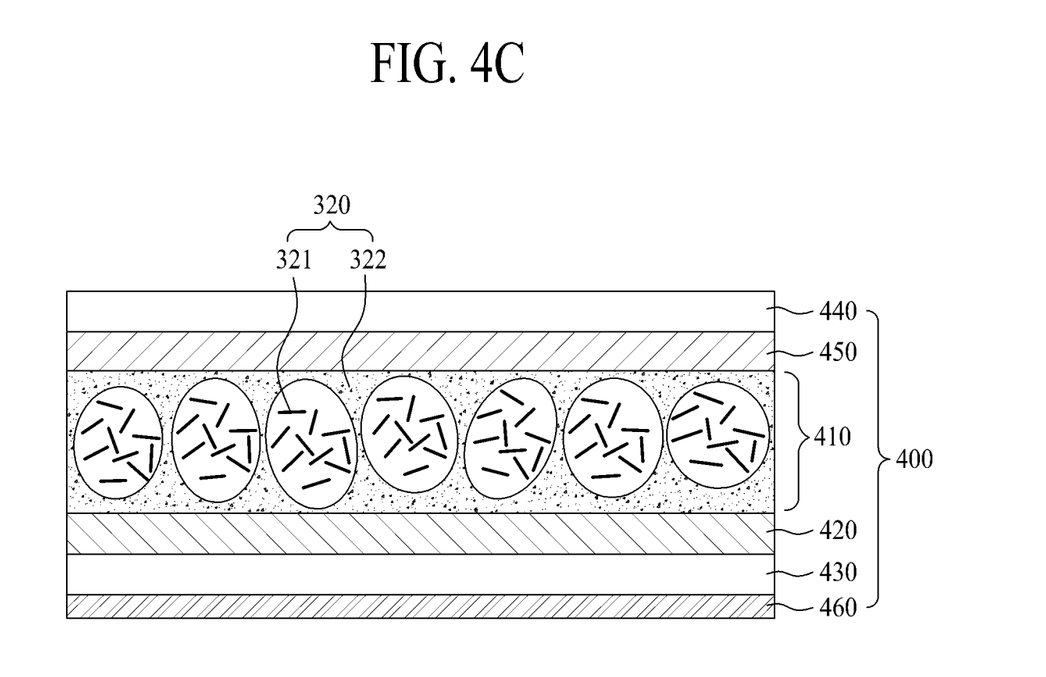

However, the transflective layer may be provided separately from the second electrode 420. That is, as shown in FIG. 4A, the transflective layer 460 may be disposed between the PDLC layer 410 and the second electrode 420. Also, as shown in FIG. 4B, the transflective layer 460 may be disposed between the second electrode 420 and the second substrate 430. Also, as shown in FIG. 4C, the transflective layer 460 may be disposed below the second substrate 430. Since the transflective layer 460 may directly be coated on the PDLC layer 410 or deposited on the outer surface of the PDLC layer 410, it is advantageous in that the liquid crystal display device according to the present invention may be manufactured and realized in various types.

As described above, the liquid crystal display device according to the first embodiment of the present invention including the liquid crystal panel 100, the transflective layer 460, and the PDLC layer 410 may be driven in a display mode (hereinafter, referred to as "first mode") for displaying an image corresponding to an image signal in a display area, a mirror mode (hereinafter, referred to as "second mode") in which external light reflected by the transflective layer 460 is transmitted by the PDLC layer 410 of the transmissive mode to allow the outside of display device to appear in the display area, and an appearance mode (hereinafter, referred to as "third mode") in which external light reflected by the transflective layer 460 is dispersed by the PDLC layer 410 of the dispersed mode to allow the display area to have a white color.

Hereinafter, the first to third modes in which the liquid crystal display device according to the first embodiment of the present invention is driven will be described in detail with reference to FIGS. 5 to 7.

Figure 5:
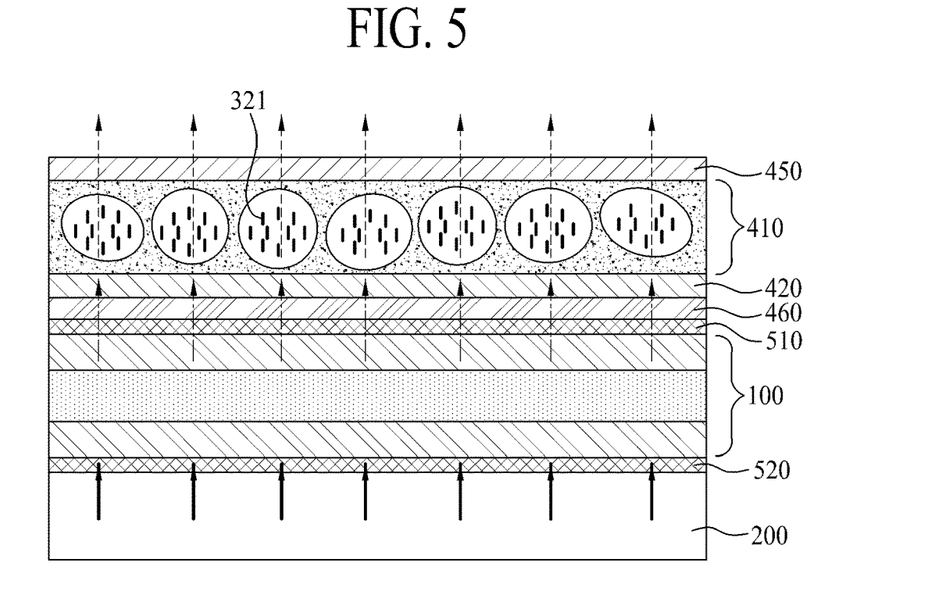
FIG. 5 is a schematic view illustrating a liquid crystal display device shown in FIG. 1 driven in a first mode.
Figure 6:
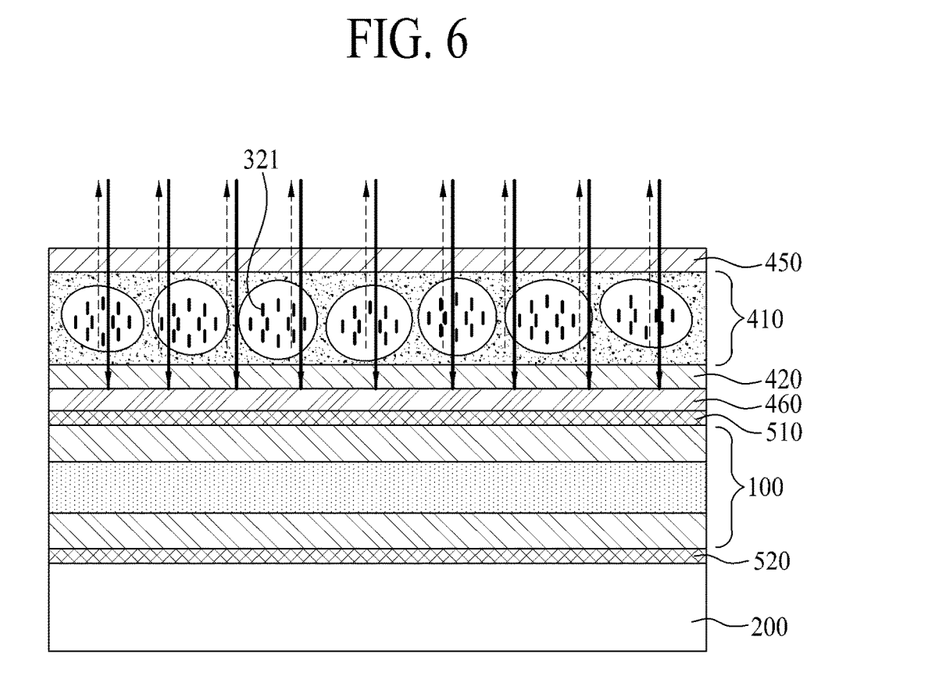
FIG. 6 is a schematic view illustrating a liquid crystal display device shown in FIG. 1 driven in a second mode.
Figure 7:
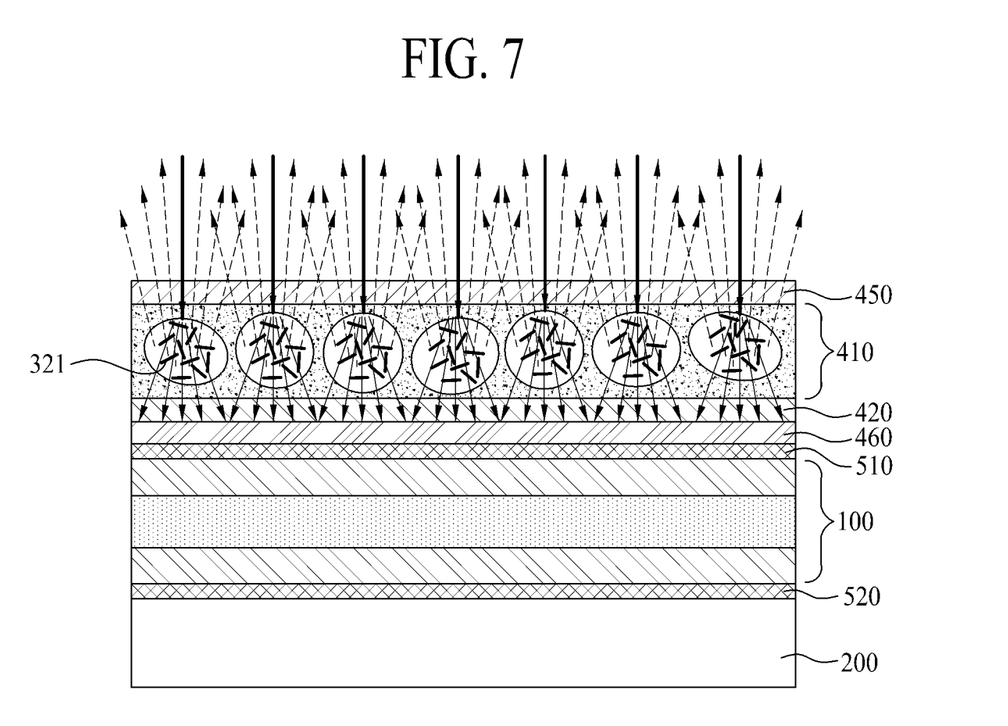
FIG. 7 is a schematic view illustrating a liquid crystal display device shown in FIG. 1 driven in a third mode.

FIG. 5 is a schematic view illustrating a liquid crystal display device shown in FIG. 1 driven in a first mode, FIG. 6 is a schematic view illustrating a liquid crystal display device shown in FIG. 1 driven in a second mode, and FIG. 7 is a schematic view illustrating a liquid crystal display device shown in FIG. 1 driven in a third mode.

FIGS. 5 to 7 illustrates a transflective layer 460 is below the PDLC layer 410 separately from the PDLC layer 410. As described above, the liquid crystal display device according to the first embodiment of the present invention may be driven in the first to third modes.

TABLE 1

| | First mode (FIG. 5) | Second mode (FIG. 6) | Third mode (FIG. 7) |
| --- | --- | --- | --- |
| Liquid crystal panel | Turn-on | Turn-off | Turn-off |
| PDLC layer | Turn-on | Turn-on | Turn-off |
| Display screen | Image display | Mirror state | White colored state |

As illustrated in Table 1, according to the first embodiment of the present invention, the liquid crystal display device of the first mode displays an image corresponding to an image signal in the display area as the liquid crystal panel 100 and the PDLC layer 410 are turned on.

As shown in FIG. 5, the liquid crystal display device of the first mode is driven using light irradiated from the backlight unit 200 as the liquid crystal panel 100 in the turn-on state emits light for displaying an image.

That is, in the liquid crystal display device of the first mode, light irradiated from the backlight unit 200 and polarized by the first polarizing layer 520 enters the liquid crystal panel 100 in the turn-on state, and the liquid crystal panel 100 in the turn-on state emits light for displaying an image by controlling light transmittance of each of the plurality of pixel areas. The transflective layer 460 transmits the light emitted from the liquid crystal panel 100 and polarized by the second polarizing layer 510, and the PDLC layer 410 in the turn-on state is driven in the transmissive mode in which the capsulated liquid crystals 321 are aligned in one direction. Therefore, the transflective layer 460 is driven to display an image in the display area by transmitting and externally emitting the incident light.

In contrast, as shown in FIGS. 6 and 7, the liquid crystal display device of the second mode and the third mode is driven using the external light reflected by the transflective layer 460 because the liquid crystal panel 100 in the turn-off state does not emit light for displaying an image.

That is, as shown in FIG. 6, in the liquid crystal display device of the second mode, the transflective layer 460 reflects the external light, and the PDLC layer 410 in the turn-on state is driven in the transmissive mode to transmit the light reflected by the transflective layer 460 and allow the transmitted light to be externally emitted, whereby the display area is driven as a mirror for reflecting the outside.

And, as shown in FIG. 7, in the liquid crystal display device of the third mode, the transflective layer 460 reflects the external light, and the PDLC layer 410 in the turn-off state is driven in the dispersed mode in which the capsulated liquid crystals 321 are randomly arranged, to disperse the light reflected by the transflective layer 460, whereby the display area has an opaque white color. At this time, since the liquid crystal panel 100 and the PDLC layer 410 are in the turn-off state in which the electric field for aligning the liquid crystals is not formed, a driving voltage is not required. That is, the liquid crystal display device of the third mode corresponds to a non-driving state in which a separate voltage is not consumed, and has a display area having a white color.

As described above, in the liquid crystal display device according to the first embodiment of the present invention, since the display area may have a white colored appearance even in the non-driving state in which a separate power is not supplied, esthetic effect as in, for example, a home appliance can be improved.

Meanwhile, in the first embodiment described as above, since the transflective layer 460 transmits light corresponding to 40% of externally incident light, there is a limitation in increasing brightness of the display area during the second and third modes. Therefore, in a display device of a second embodiment of the present invention, brightness of the display area is increased during the second and third modes.

Figure 8:
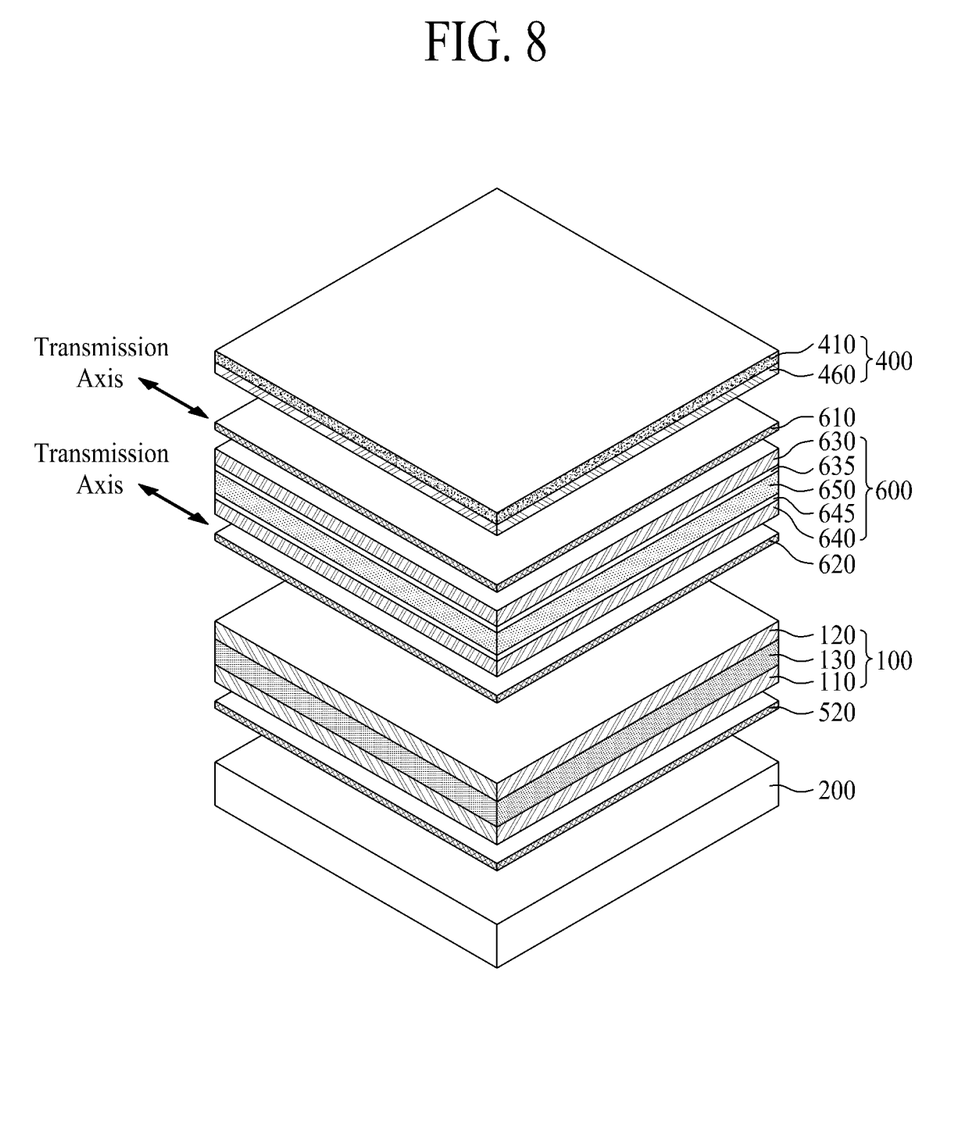
FIG. 8 is a perspective view illustrating a liquid crystal display device according to a second embodiment of the present invention.
Figure 9:
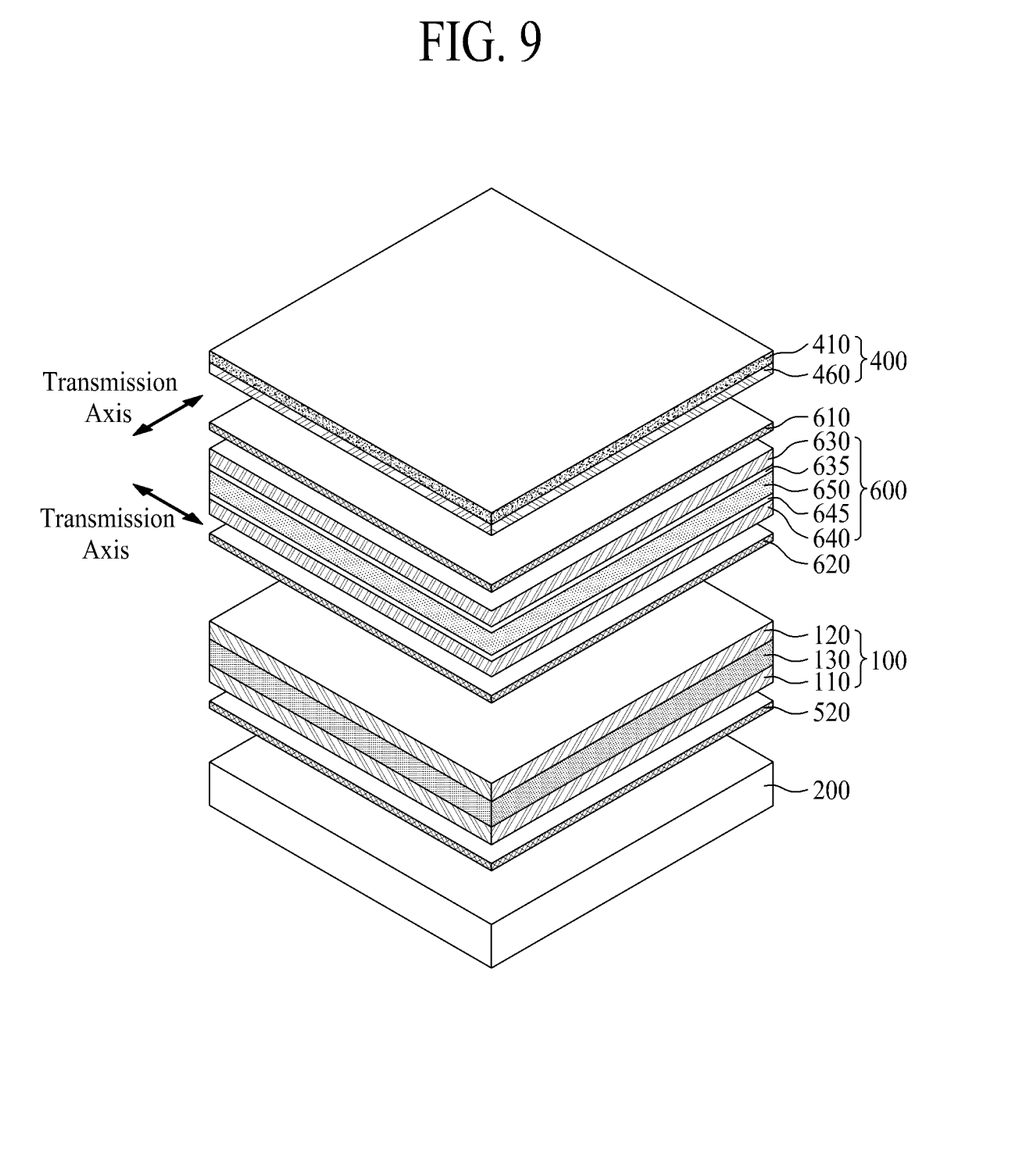
FIG. 9 is a perspective view illustrating a liquid crystal display device according to a modified example of FIG. 8.
Figure 10:
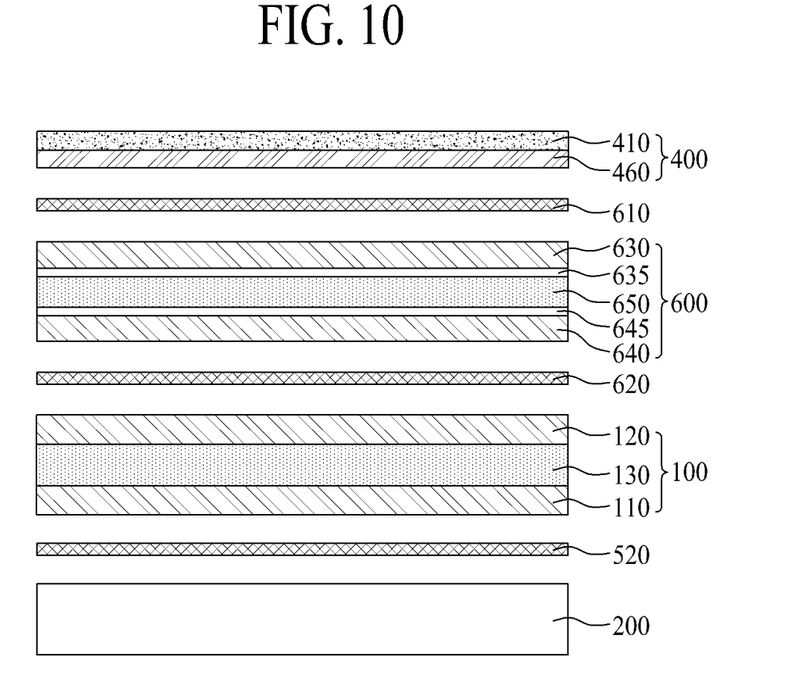
FIG. 10 is a cross-sectional view illustrating a liquid crystal display device shown in FIG. 8.

FIG. 8 is a perspective view illustrating a liquid crystal display device according to the second embodiment of the present invention. FIG. 9 is a perspective view illustrating a liquid crystal display device according to a modified example of FIG. 8. FIG. 10 is a cross-sectional view illustrating a liquid crystal display device shown in FIG. 8.

Referring to FIGS. 8 and 10, the liquid crystal display device according to the second embodiment of the present invention further includes a polarizing control panel 600, a first reflective polarized film 610, and a second reflective polarized film 620 in addition to the liquid crystal display device shown in FIG. 1. The polarizing control panel 600 is arranged between the reflective dispersed layer 400 and the liquid crystal panel 100, and controls a polarizing direction of the light from the liquid crystal panel 100. In the second embodiment, description of the same elements as those of the first embodiment will be replaced with the aforementioned description.

The polarizing control panel 600 includes third substrate 630 and fourth substrate 640 facing each other, a third electrode 635 on the third substrate 630, a fourth electrode 645 on the fourth substrate 640, and a third liquid crystal layer 650 between the third electrode 635 and fourth electrode 645.

The first reflective polarized film 610 is between the third substrate 630 and the reflective dispersed layer 400. The second reflective polarized film 620 is between the fourth substrate 640 and the liquid crystal panel 100. In this case, the second reflective polarized film 620 may serve as a second polarizing layer 510 arranged on the liquid crystal panel 100 in the first embodiment. The second polarizing layer 510 is not shown in FIGS. 8 and 9 since the second reflective polarized film 620 is served as the second polarizing layer 510.

Therefore, the structure of the present invention may be simplified.

The polarizing control panel 600 controls a polarizing direction of the light from the liquid crystal panel 100. The polarizing control panel 600 passes through the first linearly polarized light from the outside as it is or converts the first linearly polarized light to the second linearly polarized light (or circularly polarized light). For example, the first linearly polarized light means light vibrated in a z-axis direction, and the second linearly polarized light means light ongoing while being vibrated in an x-axis direction. Hereinafter, the state that the polarizing control panel 600 passes through the first linearly polarized light from the outside as it is will be defined as the transmissive mode, and the state that the polarizing control panel 600 converts the first linearly polarized light to the second linearly polarized light will be defined as a shielding mode.

The reflective polarized film basically has a transmission axis and a reflective axis, which are orthogonal to each other. Therefore, although the polarized light vibrated in a direction parallel with the transmission axis may transmit the reflective polarized film, the polarized light vibrated in a direction parallel with the reflective axis is reflected from the reflective polarized film. As the reflective polarized film according to one example, a dual brightness enhancement film (DBEF), a wire grid polarizer (WGP), or a TiO2 multi-layer film may be used.

Meanwhile, the first and second reflective polarized films 610 and 620 according to the second embodiment of the present invention may have transmission axes the same as or perpendicular to each other, as shown in FIGS. 8 and 9. That is, as shown in FIG. 8, the transmission axis of the first reflective polarized film 610 and the transmission axis of the second reflective polarized film 620 may be parallel with each other. Also, as shown in FIG. 9, the transmission axis of the first reflective polarized film 610 and the transmission axis of the second reflective polarized film 620 may be perpendicular to each other.

Hereinafter, a method for driving the liquid crystal display device according to the second embodiment of the present invention will be described in detail with reference to FIGS. 11 and 12.

Figure 11:
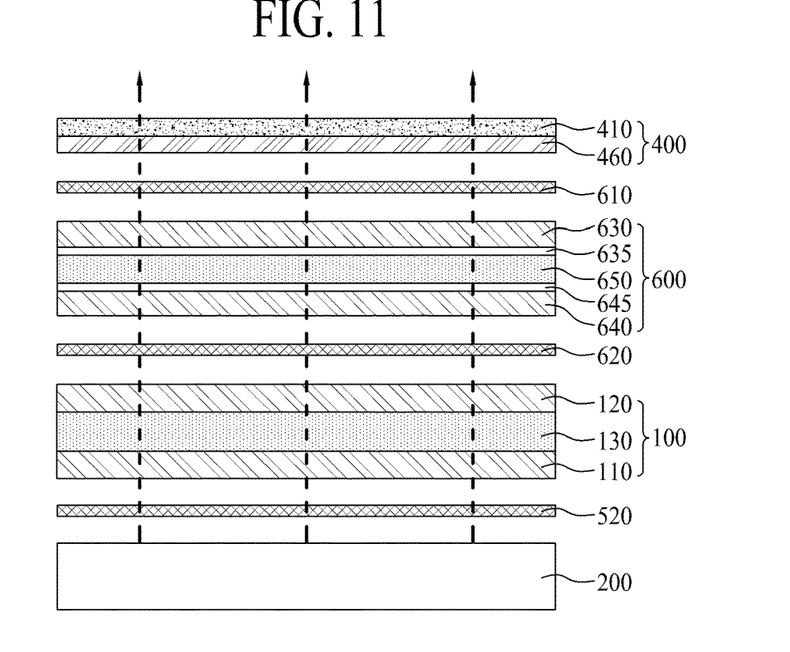
FIG. 11 is a schematic view illustrating a liquid crystal display device shown in FIG. 10 driven in a display mode.
Figure 12:
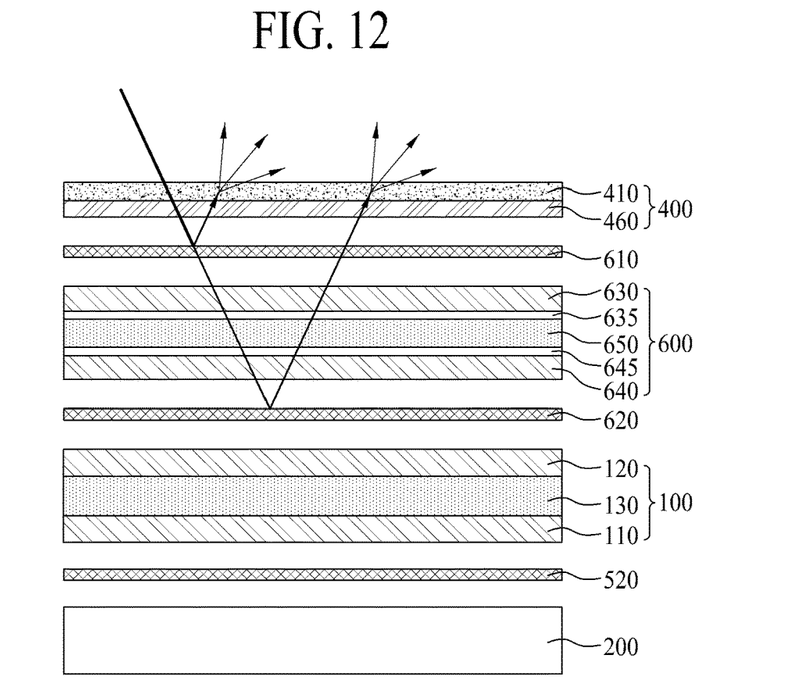
FIG. 12 is a schematic view illustrating a liquid crystal display device shown in FIG. 11 driven in a white mode.

FIG. 11 is a schematic view illustrating a liquid crystal display device shown in FIG. 10 driven in a display mode. FIG. 12 is a schematic view illustrating a liquid crystal display device shown in FIG. 11 driven in a white mode.

According to the second embodiment of the present invention, the liquid crystal display device of the display mode displays an image corresponding to an image signal in the display area as the liquid crystal panel 100 and the PDLC layer 410 are turned on.

If the transmission axis of the first reflective polarized film 610 and the transmission axis of the second reflective polarized film 620 are parallel with each other, the polarizing control panel 600 is driven in the transmissive mode to transmit the light from the liquid crystal panel 100 as it is. In more detail, the liquid crystal display device of the display mode is driven using the light irradiated from the backlight unit 200 as the liquid crystal panel 100 in the turn-on state emits the light for displaying an image.

That is, in the liquid crystal display device of the display mode in FIG. 11, the light irradiated from the backlight unit 200 and polarized by the first polarizing layer 520 enters the liquid crystal panel 100 in the turn-on state, and the liquid crystal panel 100 in the turn-on state emits the light for displaying an image by controlling light transmittance of each of the plurality of pixel areas. The polarizing control panel 600 transmits the light emitted from the liquid crystal panel 100 and polarized by the second reflective polarized film 620, and the light that has transmitted the polarizing control panel 600 transmits the first reflective polarized film 610. The transflective layer 460 transmits the light that has transmitted the first reflective polarized film 610, and the PDLC layer 410 in the turn-on state is driven in a transmissive mode in which the liquid crystals 321 are aligned in one direction, to transmit the light transmitted by the transflective layer 460 and externally emit the light, whereby an image is displayed in the display area.

In contrast, if the transmission axis of the first reflective polarized film 610 and the transmission axis of the second reflective polarized film 620 are perpendicular to each other, the polarizing control panel 600 is driven in the shielding mode to convert a polarizing direction of the light from the liquid crystal panel 100. In more detail, the polarizing control panel 600 converts the polarizing direction of the light emitted from the liquid crystal panel 100 and polarized by the second reflective polarized film 620, and the polarizing direction of the light converted by the polarizing control panel 600 is again converted by the first reflective polarized film 610. The transflective layer 460 transmits the light converted by the first reflective polarized film 610, and the PDLC layer 410 in the turn-on state is driven in a transmissive mode in which the liquid crystals 321 are aligned in one direction, to transmit the light transmitted by the transflective layer 460 as it is and externally emit the light, whereby an image is displayed in the display area.

Meanwhile, when the liquid crystal panel 100 does not emit the light for displaying the image, the liquid crystal display device of the white mode displays a white color by using the external light reflected by the transflective layer 460, the first reflective polarized film 610, and the second reflective polarized film 620.

If the transmission axis of the first reflective polarized film 610 and the transmission axis of the second reflective polarized film 620 are parallel with each other, the polarizing control panel 600 is driven in the shielding mode to convert the polarizing direction of the incident light. In more detail, in the liquid crystal display device of the white mode in FIG. 12, the transflective layer 460 reflects the external light, and the PDLC layer 410 in the turn-off state allows the capsulated liquid crystals 321 to be randomly arranged and disperses the light reflected by the transflective layer 460, whereby the display area has an opaque white color. At this time, since the liquid crystal panel 100 and the PDLC layer 410 are in the turn-off state in which the electric field for aligning the liquid crystals is not formed, a driving voltage is not required.

That is, the liquid crystal display device of the white mode corresponds to a non-driving state in which a separate voltage is not consumed, and has a display area having a white color. The light that has transmitted the transflective layer 460 is reflected by each of the first and second reflective polarized films 610 and 620, whereby brightness of the white colored display screen becomes brighter. In more detail, the light that has transmitted the transflective layer 460 is primarily reflected by the first reflective polarized film 610. After the polarizing direction of the light that has transmitted the first reflective polarized film 610 is converted by the polarizing control panel 600, the light is secondarily reflected by the second reflective polarized film 620. After the polarizing direction of the secondarily reflected light is converted by the polarizing control panel 600, the light enters the PDLC layer 410 by transmitting the first reflective polarized film 610.

In contrast, if the transmission axis of the first reflective polarized film 610 and the transmission axis of the second reflective polarized film 620 are perpendicular to each other, the polarizing control panel 600 is driven in the transmissive mode to transmit the incident light as it is. In more detail, the light that has transmitted the transflective layer 460 is primarily reflected by the first reflective polarized film 610. After the light that has transmitted the first reflective polarized film 610 transmits the polarizing control panel 600, the light is secondarily reflected by the second reflective polarized film 620. After the polarizing direction of the secondarily reflected light is converted by the polarizing control panel 600 and then converted by the first reflective polarized film 610, the light enters the PDLC layer 410.

As described above, in the liquid crystal display device according to the second embodiment of the present invention, since the display area may have a white colored appearance even in the non-driving state in which a separate power is not supplied, esthetic effect, for example, as a home appliance can be improved. Also, the first and second reflective polarized films 610 and 620 and the polarizing control panel 600 are further provided between the transflective layer 460 and the liquid crystal panel 100, whereby brightness of the white colored display screen becomes brighter.

Meanwhile, the liquid crystal display device according to the present invention may display a specific image even in case of a non-driving state of the liquid crystal panel 100 by patterning the first and second electrodes 450 and 420 for driving the PDLC layer 410 and independently driving the patterned first and second electrodes 450 and 420.

Figure 13A:
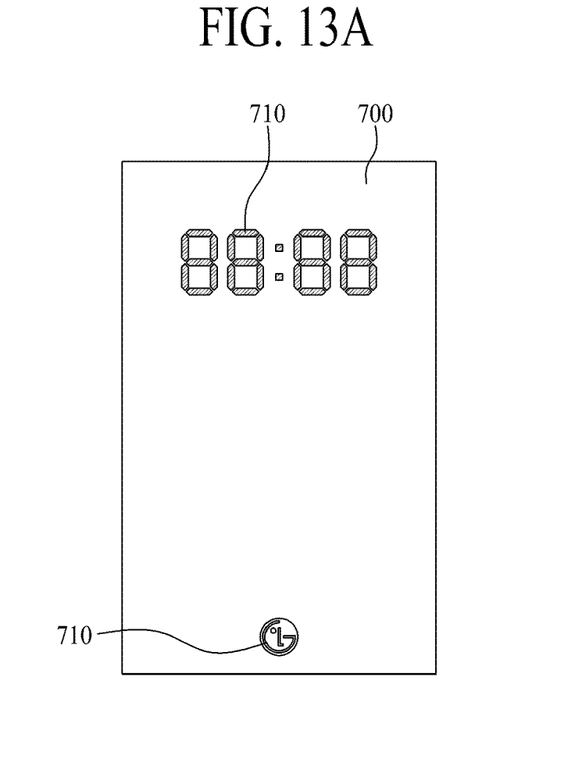
FIGS. 13A-13C are exemplary views illustrating first and second electrodes 450 and 420 patterned in accordance with the present invention.
Figure 13B:
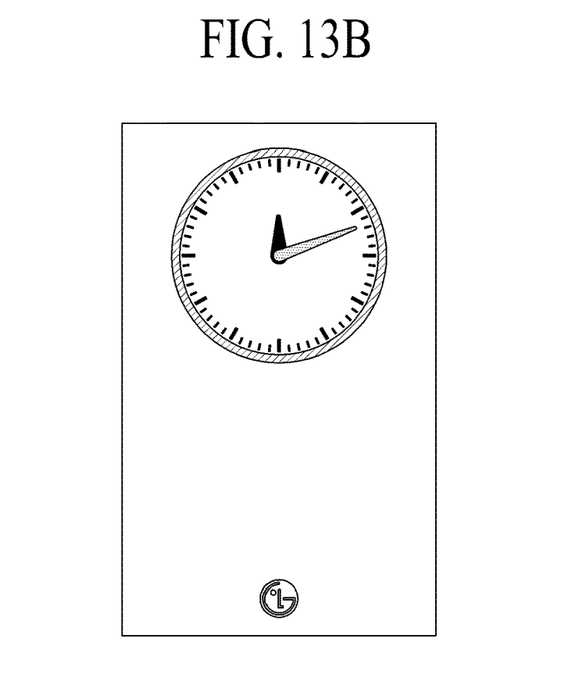
Figure 13C:
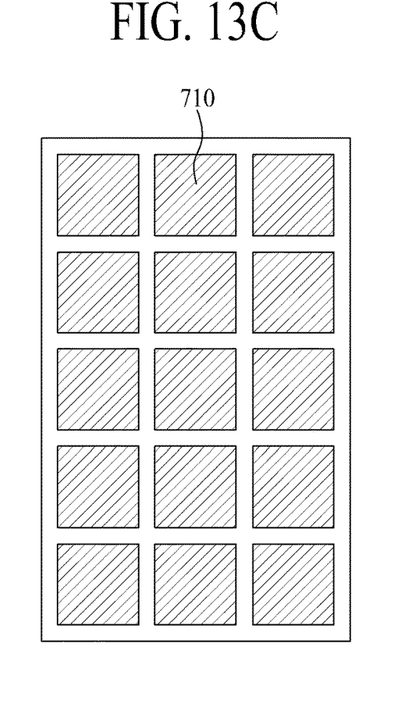

FIGS. 13A-13C are exemplary views illustrating first and second electrodes 450 and 420 patterned in accordance with the present invention.

Referring to FIGS. 13A-13C, in the reflective dispersed layer 400, the first and second electrodes 450 and 420 for driving the PDLC layer 410 are split and patterned into a plurality of areas when viewed on a plane. In more detail, the reflective dispersed layer 400 may be categorized into a first area 700 having an opaque white color during non-driving of the liquid crystal panel 100 and a second area 710 having a black color or any other color during non-driving of the liquid crystal panel 100 in accordance with the area where the first and second electrodes 450 and 420 are split.

The reflective dispersed layer 400 corresponding to the first area 700 has a white color as the PDLC layer 410 is driven in the aforementioned dispersed mode during non-driving of the liquid crystal panel 100. In the reflective dispersed layer 400 corresponding to the second area 710, the PDLC layer 410 may contain a pigment having a black color or a specific color to display a black or specific color during non-driving of the liquid crystal panel 100. The second area 710 has appearance of a specific color in the display area during non-driving of the liquid crystal panel 100 or displays a specific screen.

For example, the second area 710, as shown in FIGS. 13A and 13B, may display clock information or may be an area where a log of a manufacturer is displayed. Also, the second area 710, as shown in FIG. 13C, may be split into a plurality of areas in a matrix arrangement, and may display images different for each of the plurality of areas.

Figure 14:
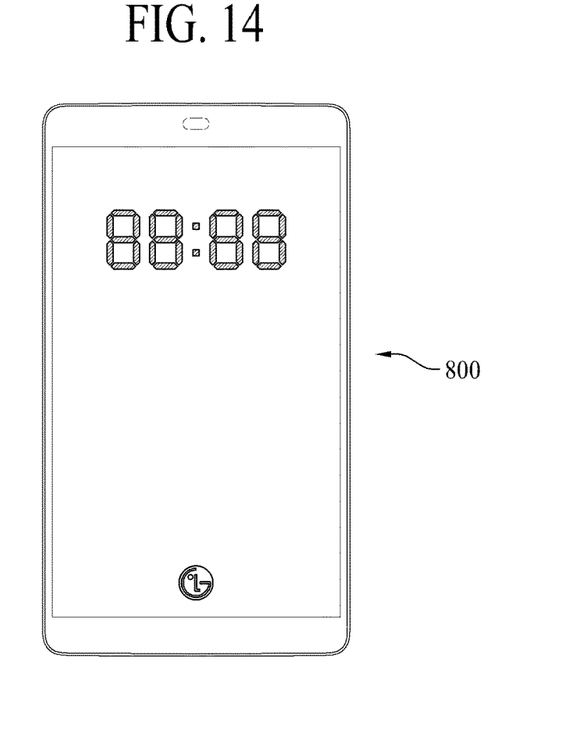
FIG. 14 is an exemplary view illustrating a portable electronic device to which the present invention is applied.

The display device having the reflective dispersed layer 400 of which first and second electrodes 450 and 420 are patterned as above may be realized as a portable electronic device 800 as shown in FIG. 14, and may be driven to display a clock or a specific screen if the portable electronic device 800 is in a locked state (or idle state).

As described above, the display device according to the present invention has the following advantages.

In the display device according to the present invention, since the PDLC layer and the transflective layer are arranged on the display panel, the display area may have white colored appearance even in case of a non-driving state that a separate power is not supplied, whereby esthetic effect as home appliance can be improved. Also, the first and second reflective polarized films and the polarizing control panel are further arranged between the transflective layer and the display panel, whereby brightness of the white colored display screen is increased, whereby esthetic effect can be improved.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device comprising:
    a display panel having a plurality of pixel areas;
    a reflective dispersed layer arranged on the display panel,
    a polarizing control panel arranged between the reflective dispersed layer and the display panel to control a polarizing direction of an incident light from the display panel;
    a first reflective polarized film between the reflective dispersed layer and the polarizing control panel; and
    a second reflective polarized film between the polarizing control panel and the display panel,
    wherein the reflective dispersed layer includes:
    first and second substrates facing each other;
    a polymer dispersed liquid crystal (PDLC) layer between the first substrate and the second substrate;
    a first electrode between the first substrate and the PDLC layer; and
    a transflective layer arranged between the PDLC layer and the second substrate to transmit light externally emitted from the display panel and reflect externally incident light in each pixel area,
    wherein the display device displays an image, with the display panel and the PDLC layer being turned on, and
    wherein the display device is in a mirror state using the externally incident light reflected by the transflective layer, with the display panel being turned off and the PDLC layer being turned on.

2. The display device of claim 1, further comprising a second electrode on the second substrate.

3. The display device of claim 2, wherein the transflective layer is provided between the PDLC layer and the second electrode or between the second electrode and the second substrate.

4. The display device of claim 1, wherein the polarizing control panel includes:
    third and fourth substrates facing each other;
    a liquid crystal layer between the third and fourth substrates;
    a third electrode between the third substrate and the liquid crystal layer; and
    a fourth electrode between the liquid crystal layer and the fourth substrate.

5. The display device of claim 1, further comprising:
    a back light unit arranged below the display panel to irradiate light towards the display panel; and
    a first polarizing layer arranged between the display panel and the backlight unit to polarize the light irradiated from the backlight unit,
    wherein the second reflective polarized film is a second polarizing layer to polarize the light emitted from the display panel.

6. The display device of claim 1, wherein the first and second reflective polarized films have transmission axes parallel with each other.

7. The display device of claim 1, wherein the first and second reflective polarized films have transmission axes perpendicular to each other.

8. The display device of claim 2, wherein the first and second electrodes are split and patterned into a plurality of areas when viewed on a plane.

9. The display device of claim 8, wherein the patterned first and second electrodes are independently driven.

10. The display device of claim 8, wherein the reflective dispersed layer includes a first area having an opaque white color during non-driving of the display panel and a second area having a predetermined color during non-driving of the display panel in accordance with an area where the first and second electrodes are split.

11. The display device of claim 1, wherein the display device is in a white colored state using the externally incident light reflected by the transflective layer, with the display panel and the PDLC layer being turned off.

* * * * *